June 24, 1930.　　　　F. J. ZALESKY　　　　1,766,238
VEHICLE
Filed May 31, 1927　　　　3 Sheets-Sheet 1

June 24, 1930.　　　F. J. ZALESKY　　　1,766,238
VEHICLE
Filed May 31, 1927　　　3 Sheets-Sheet 2

INVENTOR.
Frank J. Zalesky
BY
Hardway Cathey
ATTORNEYS

June 24, 1930.  F. J. ZALESKY  1,766,238
VEHICLE
Filed May 31, 1927  3 Sheets-Sheet 3

Inventor
Frank J. Zalesky
By Hardway & Cathey
Attorney

Patented June 24, 1930

1,766,238

UNITED STATES PATENT OFFICE

FRANK J. ZALESKY, OF BUCKHOLTS, TEXAS

VEHICLE

Application filed May 31, 1927. Serial No. 195,331.

This invention relates to new and useful improvements in a vehicle.

One object of the invention resides in a vehicle steering mechanism whereby the front and rear wheels of a truck, tractor, or other four wheeled vehicle may be simultaneously steered so as to facilitate the turning of the vehicle.

Another object of the invention is to provide a vehicle equipped with a novel type of steering mechanism whereby the front and rear wheels are operatively connected, to the end that when the front wheels are turned in one direction, in steering, the rear wheels may be turned or steered in the opposite direction to facilitate the turning of the vehicle. This type of steering mechanism is particularly useful in vehicles when connected together in a train for the reason that said vehicles will track, or approximately track, in going around corners or taking curves and will not be liable to overturn or leave the roadway.

Another object of the invention is to provide a vehicle of the character described equipped with a novel type of brake mechanism.

With the above and other objects in view this invention has particular relation to certain novel features of construction, operation, and arrangement of parts, an example of which is given in this specification and illustrated in the accompanying drawings, wherein:—

Figure 4 shows a fragmentary cross sectional view taken on the line 4—4 of Figure 2.

Figure 5 shows a fragmentary vertical sectional view taken on the line 5—5 of Figure 4.

Figure 1:
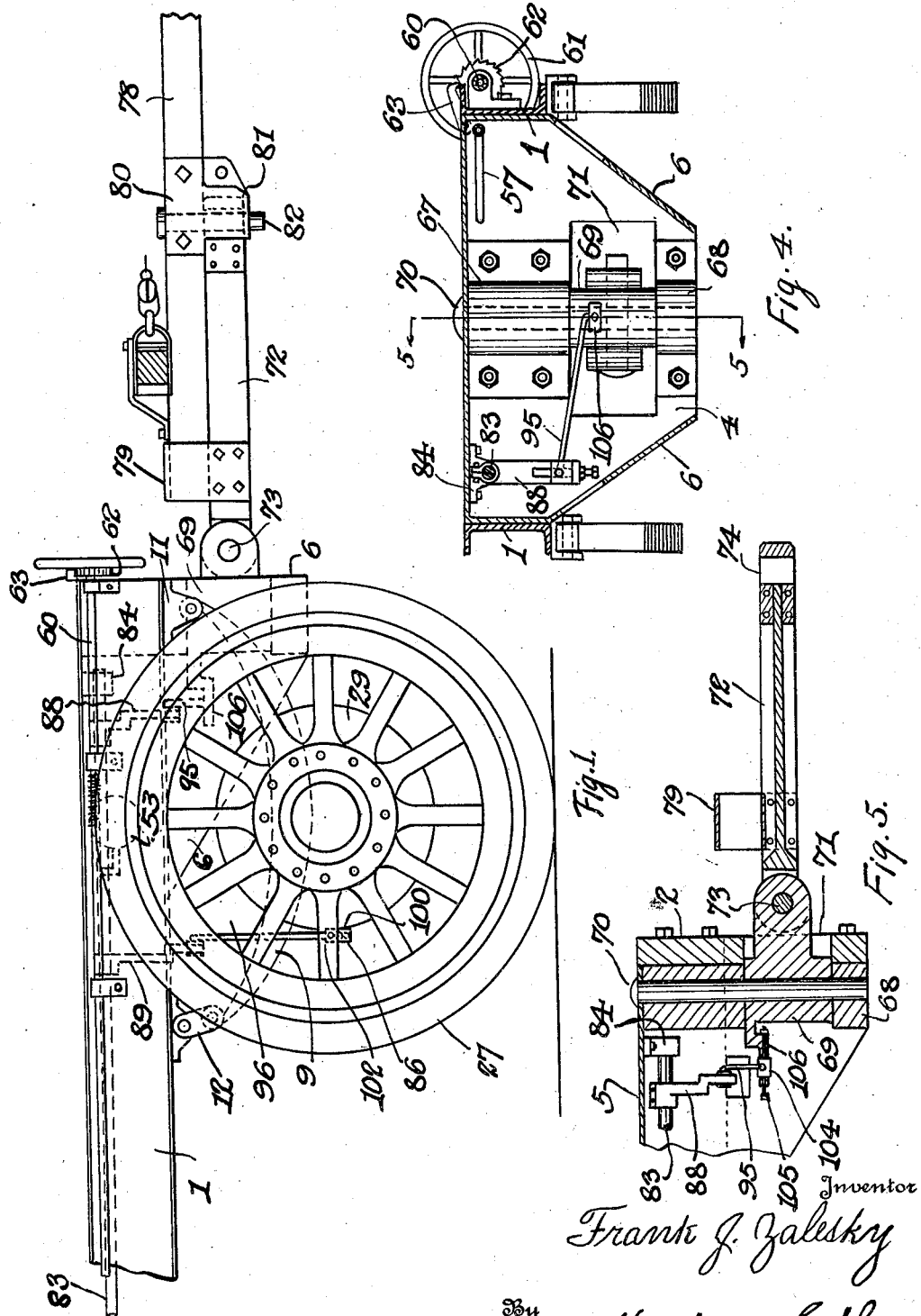
Figure 1 shows a side view of the front end of the vehicle.
Figure 2:
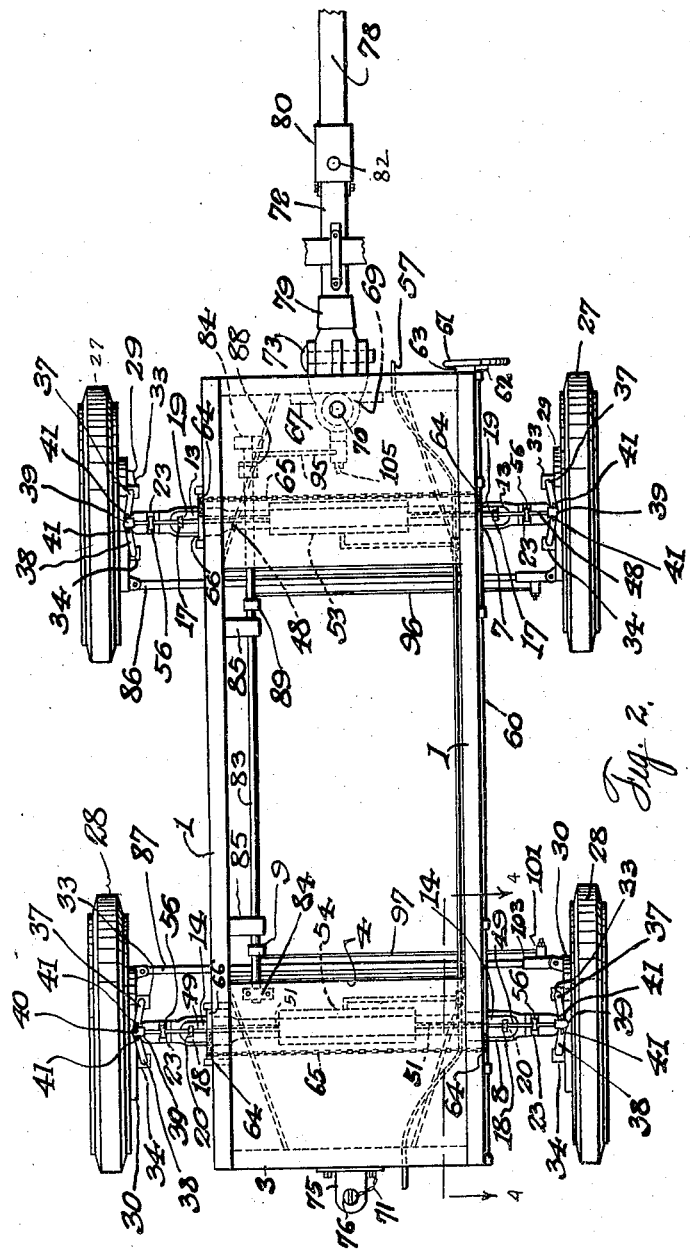
Figure 2 shows a plan view of the vehicle.
Figures 3, 6, 7:
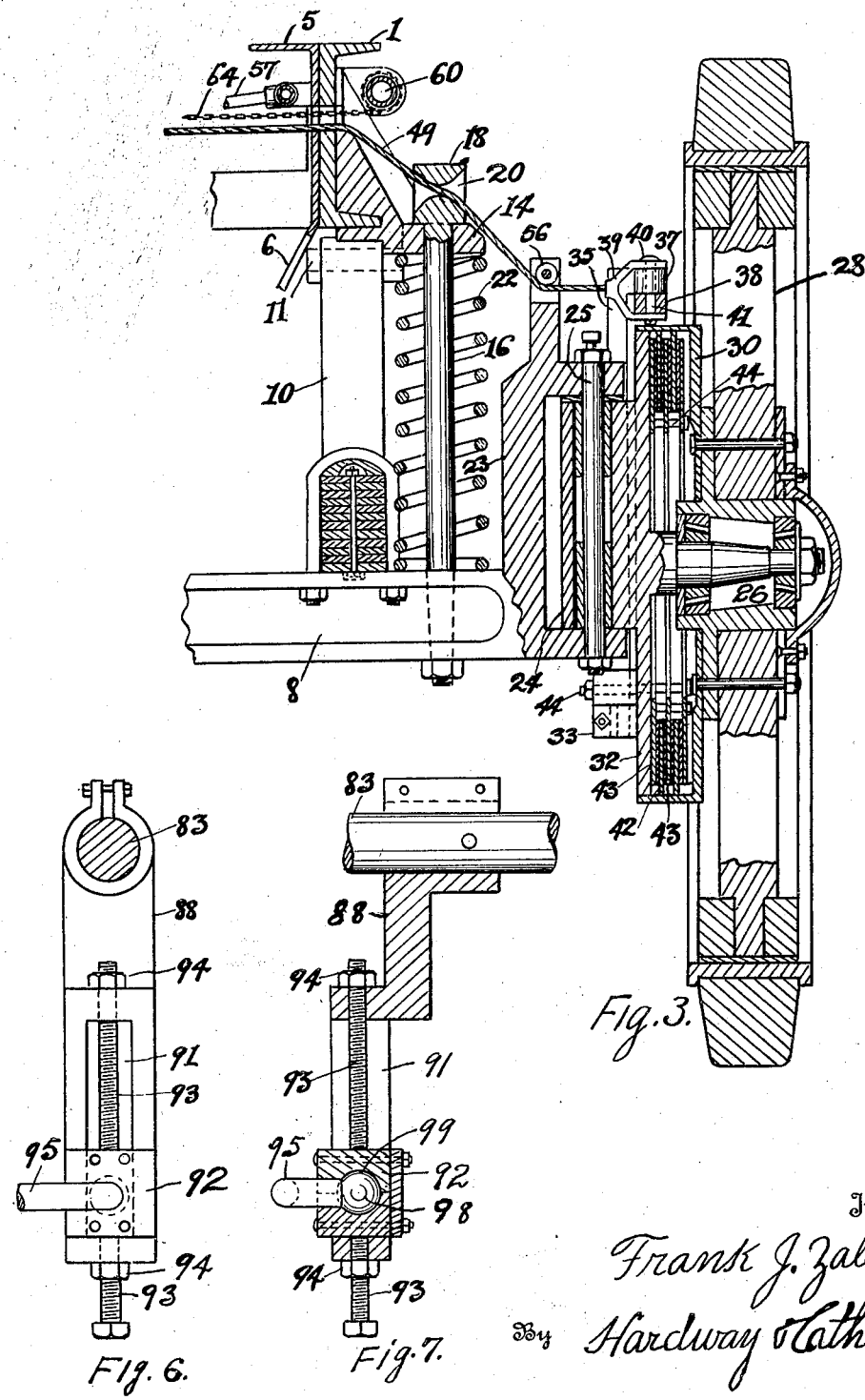
Figure 3 shows an enlarged fragmentary vertical sectional view.
Figure 6 shows an elevation of the steering arm employed.
Figure 7 shows a vertical sectional view thereof.

Referring now more particularly to the drawings, wherein like numerals of reference designate similar parts in each of the Figures, the numerals 1, 1, designate the side members of the vehicle, which vehicle may be either of the animal draft, or trailer type of vehicle. These side members are preferably formed of channel irons. The ends of these side members are anchored in spaced, fixed, relation by the end cross bars 2, 3, and as well by the intermediate cross bar 4, said side members and cross bars forming the main frame of the vehicle. There is a floor plate 5 at each end of the frame which are secured to the side members 1 and is formed integrally with the corresponding cross bars 2 and 3 and these floor plates are formed with the depending and downwardly coverging side skirts 6, 6. The numerals 7 and 8 designate, respectively, the front and rear axles of the vehicle. Anchored to these axles, in a conventional manner are the front and rear leaf springs 9 and 10, respectively, whose forward ends are connected to the corresponding side members 1 by the spring anchors 11, and whose rear ends are connected to the corresponding side members 1 by the spring shackles 12.

The side members 1 each have the front and rear outwardly extending bearings 13, and 14 and the front and rear bearing rods 15 and 16 are anchored, at their lower ends, to the corresponding front and rear axles and these rods work through the corresponding bearings 13, 14, and their upper ends have enlarged heads 17, 18 with the transverse bearings 19, 20 respectively, therethrough.

Front and rear coil springs 21, 22 surround the respective rods 15, 16 and are interposed between the corresponding front and rear axles and the bearings 13, 14 above them.

The ends of the axles 7 and 8 are formed with the respective yokes, as 23, in which are the spindle bodies, as 24, which are rotatable on vertical bearings on the spindle body bolts, as 25, whose ends are anchored to the corresponding yokes in the conventional manner and the spindle bodies 24 have the outwardly extending spindles, as 26, on which the front and rear vehicle wheels 27 and 28 are rotatably mounted.

Bolted to the inner sides of the wheels 27 and 28 are the circular brake housings 29, 30, and the corresponding spindle bodies have the integral circular end plates 31, 32, which fit into the inner ends of the opposing housings and completely enclose the same.

Secured to the rear side of the front cross bar 2 and spaced apart, one above the other are the upper and lower bearing members 67, 68 and between these members there is the swivelling yoke 69, with a bearing pin 70 fitted downwardly through said bearing members and yoke on which the yoke swivels. This yoke projects forwardly through an opening 71, in the bar 2 and a connecting link 72 is hinged to the forwardly projecting yoke end so as to work on a transverse pivot pin 73 connecting them. The forward end of the link 72 has a vertical bearing 74 and in order to connect the vehicle as a trailer to one in front of it said end of the link 74 may be inserted between the arms of a clevis 75, secured to the rear end of each vehicle and a linch pin 76 then dropped through the clevis bearings and the bearing 74. This pin is secured against loss by a suitable chain as 77.

In case draft animals are employed a tongue, as 78, is attached to the link 72 of the front vehicle. The rear end of this tongue is inserted through an inverted U-shaped bracket 79, bolted to the link 72 and the tongue 78 has a bracket 80 secured thereto and depending therefrom and forming a bearing 81 into which the forward end of the link 72 fits and in which it is secured by means of a linch pin 82.

There is a steering shaft 83 rotatable in longitudinally aligned bearings 84, 84, carried by the floor plates 5, as well as in the bearings 85, 85, carried by the adjacent side member 1.

There are the front and rear steering rods 86 and 87 whose ends are pivotally connected to the respective front and rear end plates 31, 32, the former in the rear of the front axle and the latter in front of the rear axle. Depending from the steering shaft 83 and fixed thereto are the depending steering arms 88, 89 and 90, of similar construction. Each steering arm has a vertical slot 91 therein with a bearing block 92 vertically adjustable therein through the instrumentality of the adjusting screws 93, 93, which have threaded connections with said arm and between whose inner ends said block 92 is clamped. These adjusting screws may be locked in clamping position by suitable lock nuts, as 94.

There are three connecting rods 95, 96, 97. The ends of these rods adjacent the respective arms 88, 89 and 90 are overturned and formed with ball bearings, as 98, which are fitted into sockets, as 99, provided in the blocks 92 to receive them. The other ends of the connecting rods 96, 97, have ball and socket connections with the bearing members 100, 101, which in turn are connected to the clamps 102, 103 respectively, which are clamped onto the steering rods 86, 87.

The other end of the connecting rod 95 has a ball and socket connection with an adjustable bearing block 104 which is connected to and is adjustable lengthwise, by an adjusting screw 105, with respect to the rearward extension 106 to which said rod 95 is connected.

It is clear that when the yoke 69 is turned on the rod 70 in one direction it will operate through the connecting rod 95 to correspondingly swing the arm 88 and impart a corresponding partial rotation of the steering shaft 83 which, operating through the arms 88, 89 and connecting rods 96, 97 will steer the front wheels in a direction corresponding to the movement of said yoke 69 and the rear wheels in the opposite direction thus facilitating the steering of the vehicle in the desired direction and the direction of movement of each vehicle in the train will control the direction of movement of the trailer connected on behind it so that each vehicle or trailer may be made to track the one in front of it. The movement of the respective vehicles connected in the train may be of course somewhat varied by suitably adjusting the various connecting rods 95, 96, 97 with respect to the steering arms to which they are connected.

While I have shown only one form of the invention, which I now consider to be the preferred form it is obvious that various mechanical changes may be made therein and equivalents substituted for the various parts shown and I hereby reserve the right to make such mechanical changes as may be found advisable so long as I do not depart from the scope of the appended claims.

What I claim is:—

1. In a vehicle having front and rear axles, wheel spindles pivoted to the axles to move on vertical axes, and road wheels on said spindles; steering mechanism including transverse steering rods pivotally connected to the front and rear spindles, respectively, a pivotally mounted yoke, forming a draft connection, a steering shaft steering arms fixed to said shaft and connecting rods connecting said arms, one with the draft connection and the others with the respective steering rods.

2. In a vehicle having front and rear axles, front and rear road wheels pivotally connected to said axles to move on vertical axes; steering mechanism including front and rear transverse steering rods operatively connected respectively with the front and rear wheels, a forwardly extended draft connection mounted to pivot on a vertical axis, adjustable means operatively connecting said draft connection with said rods and through which the rods may be shifted to steer the wheels, said means including a steering shaft, steering arms rigidly connected thereto and connecting rods pivotally connected to said arms, one of said rods being adjustably connected to said draft connection and the other connecting rods being connected to the respective steering rods.

3. In a vehicle having front and rear axles, a front cross bar having an opening and front and rear road wheels pivotally connected to said axles to move on vertical axes; steering mechanism including front and rear transverse steering rods operatively connected respectively with the front and rear wheels, a pivotally mounted yoke projecting forwardly through said opening and forming a draft connection mounted to pivot on a vertical axis, means operatively connecting said draft connection with said rods and through which the rods may be shifted to steer the wheels, said means including a steering shaft, steering arms rigidly connected thereto and connecting rods pivotally connected to said arms, one of said rods being adjustably connected to its arm and being also connected to said draft connection and the other connecting rods being connected to the respective steering rods, the connections of said connecting rods to said arms being adjustable.

4. In a vehicle having front and rear axles, front and rear road wheels pivotally connected to said axles to move on vertical axes; steering mechanism including front and rear transverse steering rods, operatively connected respectively with the front and rear wheels, a draft connection mounted to pivot on a vertical axis, means operatively connecting said draft connection with said rods and through which the rods may be shifted to steer the wheels, said means including a steering shaft, steering arms rigidly connected thereto, a vertically adjustable bearing block carried by one of said arms, and connecting rods pivotally connected to said arms, one of said rods being connected to said block and also connected to said draft connection and the other connecting rods being connected to the respective steering rods, the connection of said rod to said draft connection being adjustable.

5. In a vehicle having a supporting frame having a front cross bar, front and rear axles, front and rear road wheels pivotally connected to said axles to move on vertical axes; steering mechanism including front and rear transverse steering rods operatively connected respectively with the front and rear wheels, said cross bar having an opening and a yoke extending through the opening forming a draft connection mounted to pivot on the vertical axis, means operatively connecting said draft connection with said rods and through which the rods may be shifted to steer the wheels, said means including a longitudinal steering shaft, steering arms rigidly connected thereto and connecting rods pivotally connected to said arms, one of said rods being connected to said draft connection and the other connecting rods being connected to the respective steering rods, the connections of said connecting rods to said arms being adjustable, the connection of said connecting rod to said draft connection being adjustable.

In testimony whereof I have signed my name to this specification.

FRANK J. ZALESKY.